United States Patent [19]

Foster et al.

[11] Patent Number: 6,159,617
[45] Date of Patent: *Dec. 12, 2000

[54] ETHYLENE POLYMERS HAVING SUPERIOR CLARITY ENHANCED TOUGHNESS, LOW EXTRACTABLES, AND PROCESSING EASE

[75] Inventors: George Norris Foster, Bloomsbury; Tong Chen, Neshanic Station; Robert Harold Vogel, Ringoes; Scott Hanley Wasserman, Bridgewater, all of N.J.; Day-Chyuan Lee, Doylestown, Pa.; Walter Thomas Reichle, Warren; Frederick John Karol, Belle Mead, both of N.J.; Gregory Todd Whiteker, Charleston, W. Va.

[73] Assignee: Univation Technologies, LLC

[*] Notice: This patent issued on a continued prosecution application filed under 37 CFR 1.53(d), and is subject to the twenty year patent term provisions of 35 U.S.C. 154(a)(2).

[21] Appl. No.: 09/053,630

[22] Filed: Apr. 2, 1998

Related U.S. Application Data

[63] Continuation of application No. 08/611,278, Mar. 3, 1996, abandoned, which is a continuation-in-part of application No. 08/412,964, Mar. 29, 1995, Pat. No. 5,527,752.

[51] Int. Cl.[7] .................................................. B32B 27/32
[52] U.S. Cl. ........................ 428/523; 428/35.1; 428/34.9; 428/36.9; 428/910; 428/379; 174/110 PM; 525/240; 526/348.1; 526/348.2; 526/348.6; 526/943
[58] Field of Search .............................. 526/348.2, 348.6, 526/352.2, 348.1, 943; 525/240; 428/34.9, 35.1, 910, 375, 379, 364, 515, 36.9, 523; 174/110 PM, 120 SC

[56] References Cited

U.S. PATENT DOCUMENTS

| | | | |
|---|---|---|---|
| 3,023,203 | 2/1962 | Dye | 526/348.1 |
| 4,542,199 | 9/1985 | Kaminsky et al. | 526/160 |
| 4,981,760 | 1/1991 | Naito et al. | 428/523 |
| 5,206,075 | 4/1993 | Hodgson, Jr. | 428/216 |
| 5,272,236 | 12/1993 | Lai et al. | 526/348.5 |
| 5,278,272 | 1/1994 | Lai et al. | 523/348.5 |
| 5,317,036 | 5/1994 | Brady, III et al. | 523/223 |
| 5,324,800 | 6/1994 | Welborn, Jr. et al. | 526/160 |
| 5,414,040 | 5/1995 | McKay et al. | 524/576 |
| 5,420,220 | 5/1995 | Cheruvu et al. | 526/348.1 |
| 5,475,075 | 12/1995 | Brant et al. | 526/348.3 |
| 5,492,760 | 2/1996 | Sarma et al. | 428/378 |
| 5,556,697 | 9/1996 | Flenniken | 428/323 |

FOREIGN PATENT DOCUMENTS

| | | |
|---|---|---|
| 0250601 | 1/1988 | European Pat. Off. . |
| 0798313 | 1/1997 | European Pat. Off. . |
| WO9407930 | 4/1994 | WIPO . |

OTHER PUBLICATIONS

Rafael Gomez et al., Journal of Organo Metallic Chemistry, 491 (1995) 153–158, "Mono–η–cyclopentadienyl–benzamidinato chloro compounds of titanium, zirconium and hafnium".

*Primary Examiner*—Paul Thibodeau
*Assistant Examiner*—D. Lawrence Tarazano
*Attorney, Agent, or Firm*—Paul W. Leuzzi, II; Lisa K. Jones; Jaimes Sher

[57] ABSTRACT

Ethylene polymers having a) a Polydispersity Index of about 2 to about 4; b) a melt index, MI, and Relaxation Spectrum Index, RSI, such that $(RSI)(MI^{0.6})$ is about 2.5 to about 6.5; c) a Crystallizable Chain Length Distribution Index, $L_w/L_n$, of about 1.0 to about 9; and d) a density, $\rho$, and a percent haze when fabricated into films such that the percent haze is less than $370\rho-330$, are provided. These ethylene polymers advantageously combine superior clarity and toughness with low extractables and enhanced processing ease.

18 Claims, No Drawings

ETHYLENE POLYMERS HAVING SUPERIOR CLARITY ENHANCED TOUGHNESS, LOW EXTRACTABLES, AND PROCESSING EASE

This application is a continuation of Ser. No. 08/611,278 filed Mar. 19, 1996 now abandoned, which is a continuation in part of Ser. No. 08/412,964 filed Mar. 29, 1995, U.S. Pat. No. 5,527,752.

This invention relates to ethylene polymers having a narrow molecular weight distribution and a narrow composition distribution that are also easy to process with a relatively narrow relaxation time distribution. Fabricated articles made from these ethylene polymers have excellent clarity and toughness, as well as low extractables.

BACKGROUND OF THE INVENTION

Wide attention has been given to metallocene catalysts for their ability to make ethylene polymers having relatively narrow molecular weight and comonomer distributions at excellent polymerization rates. Such narrow molecular weight and comonomer distributions contribute to improvements in clarity, toughness, and extractables levels in ethylene polymers having densities much below 0.95 g/cc. However, for some applications requiring processability, such as extrudability, these ethylene polymers can be deficient due to their narrow molecular weight distributions. For example, U.S. Pat. Nos. 5,420,220 and 5,324,800 disclose metallocene-made, linear low-density polyethylenes having characteristic narrow molecular weight and comonomer distributions, along with the associated limitations in processability.

Unfortunately, if the molecular weight distribution of an ethylene polymer is broadened in order to improve processability, the clarity and impact strength of the polymer diminish. In addition, extractables increase, especially for ethylene polymers having densities much below 0.93 g/cc. To improve the processability of an ethylene polymer while maintaining a narrow molecular weight distribution, long chain branching may be incorporated into the polymer. For instance, U.S. Pat. Nos. 5,272,236 and 5,278,272 and PCT Application No. WO94/07930 describe metallocene-made, very low-density and low-density polyethylene having long chain branch structures that are reported to have improved processability. However, long chain branch structures sometimes promote directional orientation during fabrication leading to an imbalance in mechanical properties and reduced impact and tear resistance. The clarity of fabricated articles such as blown film may also be less than optimum for long chain branched ethylene polymers even with narrow molecular weight and comonomer distributions.

Applicants have identified a family of ethylene polymers having a narrow molecular weight distribution and a narrow composition distribution compared to conventional linear-low density polyethylene made from Ziegler-Natta catalysts. However, surprisingly, the ethylene polymers also have a relatively narrow relaxation time distribution, defined by their Relaxation Spectrum Index (RSI), such that the processability of the ethylene polymers is comparative, at similar melt index, to conventional, linear-low density polyethylenes made with Ziegler-Natta catalysts, which have broader molecular weight distributions, and superior to many commercial metallocene-made polyethylenes.

Film articles made from the present ethylene polymers are characterized by superior clarity, higher impact strength (e.g., dart impact), and low extractables. Similarly, injection molded articles made from the present ethylene polymers have improved clarity and toughness (e.g., low temperature properties and ESCR) as characterized by higher impact strength compared to known linear low-density polyethylenes. The enhanced toughness associated with applicants' ethylene polymers offers potential for film downgauging and molded part "thin walling" while retaining sufficient strength. Further, the ethylene polymers provide superior performance in large-volume film applications, such as stretch, high clarity, and other packaging films. And due to the low extractables of the present ethylene polymers, film and molded articles made from them are attractive for use in the food packaging market.

SUMMARY OF THE INVENTION

The invention provides an ethylene polymer having: a) a Polydispersity Index of about 2 to about 4; b) a melt index, MI, and Relaxation Spectrum Index, RSI, such that (RSI)$(MI^{0.6})$ is about 2.5 to about 6.5; c) a Crystallizable Chain Length Distribution Index, $L_w/L_n$, of about 1 to about 9; and d) a density, $\rho$, and a percent haze when fabricated into a film such that the percent haze is less than $370\rho-330$.

The invention also relates to an ethylene polymer prepared by contacting ethylene and optionally a higher alpha-olefin under polymerization conditions with a catalyst composition in unsupported, liquid form, said catalyst composition comprising a transition metal catalyst that produces substantially no long chain branching.

DETAILED DESCRIPTION OF THE INVENTION

Ethylene polymers of the invention include ethylene homopolymers, and interpolymers of ethylene and linear or branched higher alpha-olefins containing 3 to about 20 carbon atoms, with densities ranging from about 0.90 to about 0.95 and melt indices of about 0.1 to 200. Suitable higher alpha-olefins include, for example, propylene, 1-butene, 1-pentene, 1-hexene, 4-methyl-1-pentene, 1-octene, and 3,5,5-trimethyl 1-hexene. Cyclic olefins such as vinyl cyclohexane or norbornene may also be polymerized with the ethylene. Aromatic compounds having vinyl unsaturation, such as styrene and substituted styrenes, may also be included as comonomers. Particularly preferred ethylene polymers comprise ethylene and about 1 to about 40 percent by weight of one or more comonomers described above.

The ethylene polymers have Polydispersity Indices uncorrected for long chain branching of about 2.0 to about 4.0, preferably about 2.5 to about 3.5. The Polydispersity Index (PDI) of a polymer is defined as the ratio of the weight average molecular weight of the polymer to the number average molecular weight of the polymer ($M_w/M_n$). PDI, uncorrected for long chain branching, is determined using size exclusion chromatography (SEC) with a WATERS 150C GPC instrument operating at 140° C. with 1,2, 4trichlorobenzene at a flow rate of 1 ml/min. The pore size range of the column set provides for a MW separation covering the 200 to 10,000,000 Daltons range. National Institute of Standards Technology polyethylene standard NBS 1475 or 1496 is used as the calibration standard to obtain the uncorrected (linear polymer assumed) molecular weight distribution.

The present ethylene polymers have unique rheological properties that suggest a distinct molecular structure and impart superior toughness in fabricated articles. These unique rheological properties also favor relative ease of fabrication into finished articles, especially in film extrusion.

In particular, the ethylene polymers have melt indexes, MI, and Relaxation Spectrum Indexes, RSI, such that, for a given ethylene polymer:

about 2.5<(RSI)(MI$^{0.6}$)<about 6.5.

Preferably, about 3.0<(RSI)(MI$^{0.6}$)<about 5.0.

In the formulae immediately above, MI is the melt index of the polymer reported as grams per 10 minutes, determined in accordance with ASTM D-1238, condition E, at 190° C., and RSI is the Relaxation Spectrum Index of the polymer in dimensionless units.

The RSI of the ethylene polymer is determined by first subjecting the polymer to a shear deformation and measuring its response to the deformation using a rheometer. As is known in the art, based on the response of the polymer and the mechanics and geometry of the rheometer used, the relaxation modulus G(t) or the dynamic moduli G'(ω) and G"(ω) may be determined as functions of time t or frequency ω, respectively (see J. M. Dealy and K. F. Wissbrun, *Melt Rherotie and Its Role in Plastics Processing*, Van Nostrand Reinhold, 1990, pp. 269–297). The mathematical connection between the dynamic and storage moduli is a Fourier transform integral relation, but one set of data may also be calculated from the other using the well known relaxation spectrum (see S. H. Wasserman, *J. Rheology*, Vol. 39, pp. 601–625 (1995)). Using a classical mechanical model a discrete relaxation spectrum consisting of a series of relaxations or "modes," each with a characteristic intensity or "weight" and relaxation time, may be defined. Using such a spectrum, the moduli are re-expressed as:

$$G'(\omega) = \sum_{i=1}^{N} g_i \frac{(\omega \lambda_i)^2}{1+(\omega \lambda_i)^2}$$

$$G''(\omega) = \sum_{i=1}^{N} g_i \frac{\omega \lambda_i}{1+(\omega \lambda_i)^2}$$

$$G(t) = \sum_{i=1}^{N} g_i \exp(-t/\lambda_i)$$

where N is the number of modes and $g_i$ and $\lambda_i$ are the weight and time for each of the modes (see J. D. Ferry, *Viscoelastic Properties of Polymers*, John Wiley & Sons, 1980, pp. 224–263). A relaxation spectrum may be defined for the polymer using software such as IRIS® rheological software, which is commercially available from IRIS Development. Once the distribution of modes in the relaxation spectrum is calculated, the first and second moments of the distribution, which are analogous to $M_n$ and $M_w$, the first and second moments of the molecular weight distribution, are calculated as follows:

$$g_I = \sum_{i=1}^{N} g_i \Big/ \sum_{i=1}^{N} g_i/\lambda_i$$

$$g_{II} = \sum_{i=1}^{N} g_i \lambda_i \Big/ \sum_{i=1}^{N} g_i$$

RSI is defined as $g_{II}/g_I$.

Because RSI is sensitive to such parameters as a polymer's molecular weight distribution, molecular weight, and long chain branching, it is a sensitive and reliable indicator of the stress relaxation of a polymer. The higher the value of RSI, the broader the relaxation time distribution of the polymer, and therefore the better the processability of the polymer.

In addition, the ethylene polymers have a Crystallizable Chain Length Distribution Index, $L_w/L_n$, of about 1 to about 9, preferably about 1 to about 6, indicating that they have relatively narrow comonomer distributions and therefore relative compositional homogeneity. The Crystallizable Chain Length Distribution Index is determined using Temperature Rising Elution Fractionation (TREF), as described in Wild et al., *J. Polymer Sci., Poly. Phys. Ed.*, Vol. 20, p. 441 (1982). A dilute solution of the ethylene polymer in a solvent such as 1,2,4-trichlorobenzene, at 1–4 mg/ml, is loaded at high temperature onto a packed column. The column is then allowed to slowly cool down at 0.1° C./min. to ambient temperature in a controlled manner so that the ethylene polymer is crystallized onto the packing in the order of increasing branching (or decreasing crystallinity) with the decreasing temperature. The column is then heated in a controlled manner at 0.7° C./min. to above 140° C. with a constant solvent flow of 2 ml/min. through the column. The polymer fractions as they are eluted have decreasing branching (or increasing crystallinity) with the increasing temperature. An infrared concentration detector is used to monitor effluent concentrations. From the TREF temperature data, the branch frequency may be obtained for a given comonomer. Consequently, the main chain lengths between branches, expressed as $L_w$ and $L_n$, may be calculated as follows. $L_w$ is the weight average chain length between branches:

$$L_w = \Sigma_i w_i L_i$$

and $L_n$ is the number average chain length between branches:

$$L_n = 1/\Sigma_i (w_i/L_i),$$

wherein $w_i$ is the weight fraction of the polymer component i having an average backbone chain spacing $L_i$ between two adjacent branch points.

The present ethylene polymers have low haze when formed into films, indicating a superior clarity at a given polymer density. In particular, the ethylene polymers have a percent haze when in the form of a film and density such that, for a given ethylene polymer:

% Haze<(370ρ−330), wherein ρ is the polymer density. Preferably,

% Haze<(370ρ−335).

Density is measured according to ASTM test method D1505 (G-101). The percent haze measurement is carried out according to ASTM test method D1003, which measures the transmitted light that, in passing through the specimen, deviates from the incident beam by forward scattering. For the purposes of this test method, only light flux deviating more than 2.5° on the average is considered to be haze.

Catalyst compositions that may be used to make the ethylene polymers of the invention are in unsupported, liquid form and comprise transition metal catalysts that produce substantially no long chain branching, preferably no long chain branching. Such transition metal catalysts include compounds comprising complexes of transition metals, substituted or unsubstituted π-bonded ligands, and heteroallyl moieties, such as those described in copending U.S. application Ser. No. 08/412,964 filed Mar. 29, 1995. Preferably, such compounds have one of the following formulas:

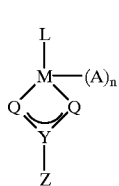
(I)

wherein:

M is a transition metal, preferably Zr or Hf;

L is a substituted or unsubstituted, π-bonded ligand coordinated to M, preferably a cycloalkadienyl ligand;

each Q is independently selected from the group consisting of —O—, —NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$ and —H, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;

n is 1 or 2;

A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent.

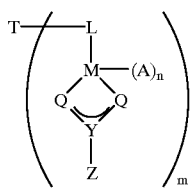
(II)

wherein:

M is a transition metal, preferably Zr or Hf;

L is a substituted or unsubstituted, π-bonded ligand coordinated to M, preferably a cycloalkadienyl ligand;

each Q is independently selected from the group consisting of —O—, —NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$ and —H, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;

n is 1 or 2;

A is a univalent anionic group when n is 2 or A is a divalent anionic group when n is 1, preferably A is a carbamate, carboxylate, or other heteroallyl moiety described by the Q, Y and Z combination;

each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;

T is a bridging group selected from the group consisting of alkylene and arylene groups containing from 1 to 10 carbon atoms optionally substituted with carbon or heteroatoms, germanium, silicone and alkyl phosphine; and m is 1 to 7, preferably 2 to 6, most preferably 2 or 3.

Particularly preferred compounds comprising complexes of transition metals, substituted or unsubstituted π-bonded ligands, and heteroallyl moieties are indenyl zirconium tris(diethylcarbamate) and indenyl zirconium tris(pivalate).

Other transition metal catalysts that may be used to prepare the ethylene polymers are those derivatives of mono- and unbridged bis- and tricyclopentadienyl coordination complexes with a transition metal, such as those described in U.S. Pat. Nos. 4,542,199, 5,324,800, and European Patent 250,601-B1, that produce substantially no, preferably no, long chain branching in ethylene polymers. Examples of such catalysts are bis(cyclopentadienyl) zirconium dichloride and bis(cyclopentadienyl) zirconium diphenoxide.

The catalysts are used in conjunction with activating cocatalysts such as aluminoxanes, i.e., methylaluminoxane (MAO) or modified methylaluminoxane (MMAO), or boron alkyls, to form the unsupported, liquid form catalyst compositions for the production of the ethylene polymers. Aluminoxanes are preferred cocatalysts, and their method of preparation and use is well known in the art.

The catalyst compositions used to produce the ethylene polymers must be introduced into the reaction zone in unsupported, liquid form, as described in U.S. Pat. No. 5,317,036. As used herein, "unsupported, liquid form" includes liquid catalyst, liquid cocatalyst, solution(s) of catalyst and cocatalyst in the same or different solvent(s), and combinations thereof. In addition to their ability to prepare the present ethylene polymers having advantageous properties, soluble catalyst compositions have a number of additional practical benefits. Unsupported catalyst compositions avoid the costs associated with support material and its preparation, and the provide for the realization of a very high catalyst surface area to volume ratio. Furthermore, unsupported catalyst compositions produce polymers having a much lower residual ash content than polymers produced using supported catalyst compositions.

The ethylene polymers may be made by any conventional suspension, solution, slurry or gas phase polymerization process, using reaction conditions well known in the art. One reactor or several reactors in series may be employed. Gas phase polymerization is preferred using one or more fluidized bed reactors.

Polymerization is preferably conducted in the gas phase in a stirred or fluidized bed reactor, using equipment and procedures well known in the art. Preferably, superatmospheric pressures in the range of 1 to 1000 psi, preferably 50 to 400 psi, and most preferably 100 to 300 psi, and temperatures in the range of 30 to 130° C., preferably 65 to 110° C. are used. Ethylene and other monomers, if used, are contacted with an effective amount of catalyst composition at a temperature and a pressure sufficient to initiate polymerization.

Suitable gas phase polymerization reaction systems comprise a reactor to which monomer(s) and catalyst composition may be added, and that contain a bed of forming polyethylene particles. The invention is not limited to any specific type of gas phase reaction system. As an example, a conventional fluidized bed process is conducted by passing a gaseous stream containing one or more monomers continuously through a fluidized bed reactor under reaction conditions and in the presence of catalyst composition at a velocity sufficient to maintain the bed of solid particles in a suspended condition. The gaseous stream containing unreacted gaseous monomer is withdrawn from the reactor continuously, compressed, cooled, optionally partially or fully condensed, and recycled into the reactor. Product is withdrawn from the reactor and make-up monomer is added to the recycle stream.

Conventional additives may be included in the process, provided they do not interfere with the functioning of the catalyst composition.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

Organometallic compounds may be employed as scavenging agents for poisons to increase the catalyst activity. Examples of these compounds are metal alkyls, preferably aluminum alkyls, most preferably trisobutyl-aluminum tri-n-hexyl aluminum. Use of such scavenging agents is well known in the art.

The ethylene polymers may be blended with other polymers and resins as desired using techniques known in the art. In addition, various additives and reagents may be mixed with the ethylene polymers. Specifically, additional thermo- and photo-oxidation stabilizers including hindered phenolic and hydroxy amino antioxidants, hindered amine light stabilizers, thioesters, or disulfide and aryl phosphites or phosphonites can be added. To meet specialized product requirements crosslinkers including dicumyl peroxide, colorants including carbon blacks and titanium dioxide, lubricants including metallic stearates, processing aids including fluoroelastomers, slip agents including oleamide or erucamide, antiblock or release agents including stearamide, ethylene bis-stearamide, controlled particle size zeolite, calcium carbonate, talc, or silica, blowing agents, flame retardants and other conventional materials may be mixed with the ethylene polymer of the invention as desired.

The ethylene polymers of the invention are useful for fabrication into a variety of finished articles such as films including clarity films and shrink films, extrusion coatings, wire and cable insulation and jacketing, crosslinked power cable insulation, molded articles made by injection molding, blow molding, or rotational molding, extrusions of pipe, tubing, profiles and sheeting, and insulating and semiconductive jacketing and/or shields. Methods of making such articles are well known in the art.

The disclosures of the patents referred to above are incorporated herein by reference.

The following non-limiting examples further illustrate the invention.

EXAMPLES

Measurements

Molecular Weights and Molecular Weight Distribution were determined as follows. A WATERS 150C GPC chromatograph equipped with mixed-pore size columns for molecular weight measurements was employed. For the size exclusion chromatography (SEC), a 25 cm long preliminary column from Polymer Labs having a 50 Å nominal pore size, followed by three 25 cm long Shodex A-80 M/S (Showa) columns to affect a molecular weight separation for linear ethylene polymer from about 200 to 10,000,000 Daltons were used. Both columns contained porous poly (styrene-divinyl benzene) packing. 1,2,4,-trichlorobenzene was used as the solvent to prepare the polymer solutions and the chromatographic eluent. All measurements were made at a temperature of 140±0.2° C. The analog signals from the mass and viscosity detectors were collected into a computer system. The collected data were then processed using standard software commercially available from several sources (Waters Corporation and Viscotek Corporation) for molecular weight distribution uncorrected for long chain branching. The calibration used the broad MWD calibrant method and a linear polymer as the calibrant. (See W. W. Yau, J. J. Kirkland and D. D. Bly, *Modern Size-Exclusion Liquid Chromatography*, Wiley, 1979, p. 289–313.) For the latter, two MW related statistics such as number and weight average MW values must be known for the polymer calibrant. Based on the MW calibration, elution volume is converted to molecular weight for the assumed linear ethylene polymer.

Rheological measurements were done via dynamic oscillatory shear experiments conducted with a new model of the Weissenberg Rheogoniometer commercially available from TA Instruments. Experiments were run in parallel plate mode under a nitrogen atmosphere at 190° C. Sample sizes ranged from approximately 1100 to 1500 $\mu$m and were 4 cm in diameter. The frequency sweep experiments covered a frequency range of 0.1 to 100 $sec^{-1}$ with a 2% strain amplitude. The torque response was converted by the TA Instruments rheometer control software to dynamic moduli and dynamic viscosity data at each frequency. Discrete relaxation spectra were fit to the dynamic moduli data for each sample using the IRIS® commercial software package.

TREF measurements were made as described above. The melt index of the polymers reported as grams per 10 minutes, was determined in accordance with ASTM D1238, condition E. Density measurements were done according to ASTM test method D1505 (G-101). Haze was measured according to ASTM test method D1003.

Examples 1–19 and A–N

A series of ethylene polymers according to the invention (Examples 1–19) were compared with samples of known polyethylene for a variety of properties, including Polydispersity Index (PDI), Crystallizable Chain Length Distribution Index ($L_w/L_n$), melt index (MI), Relaxation Spectrum Index (RSI), percent haze, and density. The results are shown in the Table.

The ethylene polymers in Examples 1–19 were made using a 14 inch nominal diameter, gas phase, fluidized bed reactor having a bed height of 10 feet. Each of the catalyst compositions in Examples 1–19 were in unsupported, liquid-form.

The catalyst composition employed to make Examples 1–12 comprised indenyl zirconium tris(diethylcarbamate) catalyst and modified methylaluminoxane activating cocatalyst.

The catalyst composition employed to make each of Examples 13–17 comprised indenyl zirconium tris(pivalate) catalyst and modified methylaluminoxane activating cocatalyst.

The catalyst composition employed to make Examples 18 and 19 comprised bis(cyclopentadienyl) zirconium dichloride and bis(cyclopentadienyl) zirconium diphenoxide, respectively, and modified methylaluminoxane activating cocatalyst.

Examples 9–12 were linear copolymers of ethylene and 1-butene, whereas Examples 1–8 and 13–19 were linear copolymers of ethylene and 1-hexene.

Comparative Examples A and B were AFFINITY Polyolefin Plastomers commercially available from The Dow Chemical Company, as specified in the Table.

Comparative Examples C–H were EXCEED and EXACT linear ethylene polymers commercially available from Exxon Chemical, as specified in the Table.

Comparative Example I was a linear ethylene polymer commercially available from BASF, as specified in the Table.

Comparative Example J was a linear copolymer of ethylene and 1-hexene also made using a 14 inch nominal diameter, gas phase, fluidized bed reactor having a bed height of 10 feet. The catalyst composition employed to make Comparative Example J comprised bis(n-butyl cyclopentadienyl) zirconium dichloride catalyst and modified methylaluminoxane activating cocatalyst supported on silica.

Comparative Examples K–N were commercial, linear low-density polyethylenes made by the UNIPOL® process (Union Carbide Corp.) using a gas phase, fluidized bed reactor. There were ethylene copolymers of 1-butene or 1-hexene, and are commercially available under the product designations HS 7093, HS 7037, HS 7028 and DFDA 9064.

Comparative Example O was a linear copolymer of ethylene and 1-hexene made in the same manner as Example 18, except the catalyst composition employed was bis (cyclopentadienyl) zirconium dichloride and modified methylaluminoxane activating cocatalyst supported on silica.

The ethylene polymers of the invention were each dry blended with about 1500 ppm IRGANOX B-900 (Ciba-Geigy Corporation) and compounded in a 1½ inch Killion Extruder with a standard LLDPE mixing screw (30/1 length to diameter) at a rate of 40 lb/hr (~98 rpm). The pelleted ethylene polymers of the invention and the Comparative Example polyethylenes were extruded into blown films using typical operating conditions with die temperatures and blow up ratios as listed in the Table. Blow up ratio is defined as the ratio of the final bubble (tube) diameter to the die diameter. The blown film extrusion equipment consisted of a 1½ inch diameter Sterling extruder equipped with 24:1 L/D, general purpose LLDPE screw (constant pitch, decreasing depth, Maddox mixing-head screw) and a spiral pin die. The blown film extrusion equipment was operated at a rate of 45 lb/hr (~98 rpm).

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| MI | 0.44 | 0.68 | 0.68 | 0.85 | 1.70 | 1.83 | 1.99 | 2.29 | 1.23 | 1.41 | 1.66 | 1.67 | 0.50 | 0.79 |
| Density (g/cc) | 0.938 | 0.937 | 0.937 | 0.937 | 0.929 | 0.929 | 0.926 | 0.915 | 0.924 | 0.923 | 0.924 | 0.925 | 0.937 | 0.922 |
| PDI | 3.47 | 2.78 | 2.78 | 2.66 | 2.70 | 2.52 | 3.13 | 2.66 | 2.61 | 2.49 | 2.51 | 2.74 | 2.70 | 2.89 |
| Lw/Ln | 8.90 | 5.31 | 5.31 | 4.13 | 7.24 | 5.88 | 6.44 | 3.48 | 5.79 | 5.80 | 5.78 | 5.98 | 6.57 | 8.58 |
| RSI | 5.7 | 3.6 | 3.6 | 3.1 | 2.2 | 2.1 | 2.4 | 1.9 | 2.7 | 2.3 | 2.2 | 2.2 | 4.1 | 4.6 |
| Haze (%) | 7.5 | 5.2 | 4.1 | 5.2 | 6.0 | 5.6 | 3.6 | 3.0 | 7.2 | 7.4 | 6.4 | 8.6 | 5.6 | 5.2 |
| Hexane Extract. | 0.6 | 0.4 | 0.3 | 0.6 | 0.4 | 0.4 | 2.6 | 1.2 | 0.4 | 0.6 | 0.5 | 0.4 | 0.5 | 1.2 |
| Dart Drop (g) | 50 | 50 | 50 | 50 | 77 | 73 | 131 | 482 | 53 | 62 | 58 | 65 | 109 | 200 |
| Die Gap (mils) | 100 | 100 | 100 | 100 | 100 | 100 | 100 | 100 | 100 | 100 | 100 | 100 | 100 | 100 |
| Melt Temp (° F.) | 500 | 500 | 455 | 450 | 379 | 380 | 388 | 428 | 405 | 402 | 402 | 400 | 500 | 470 |
| Blow Up Ratio | 2.6 | 2.6 | 2.6 | 2.6 | 2.6 | 2.6 | 2.6 | 2.6 | 2.6 | 2.6 | 2.6 | 2.6 | 2.6 | 2.6 |
| Head Pressure (psi) | 2550 | 2200 | 2650 | 2350 | 1975 | 2200 | 1800 | 900 | 2550 | 2200 | 2225 | 2400 | 2300 | 1850 |
| Amperage | 14.1 | 14.2 | 14.2 | 14.2 | 14.5 | 14.5 | 13.8 | 9.5 | 15.0 | 14.8 | 14.6 | 15.1 | 14.8 | 14.0 |
| Die Rate (lb/hr/in) | 6.5 | 6.7 | 6.4 | 6.7 | 7.0 | 7.2 | 7.1 | 6.4 | 6.5 | 6.7 | 6.9 | 6.5 | 6.5 | 7.2 |
| A = 370p−335 | 14.27 | 13.94 | 13.94 | 13.79 | 10.78 | 10.93 | 9.82 | 5.84 | 8.89 | 8.55 | 8.89 | 9.48 | 13.90 | 8.33 |
| B = RSI*MI0.6 | 3.47 | 2.85 | 2.85 | 2.81 | 3.04 | 3.04 | 3.65 | 3.15 | 3.06 | 2.84 | 3.00 | 3.01 | 2.68 | 3.97 |
| Haze < A | Yes | Yes | Yes | Yes | Yes | Yes | Yes | Yes | Yes | Yes | Yes | Yes | Yes | Yes |
| 2.5 < B < 6.5 | Yes | Yes | Yes | Yes | Yes | Yes | Yes | Yes | Yes | Yes | Yes | Yes | Yes | Yes |
| 2 < PDI < 4 | Yes | Yes | Yes | Yes | Yes | Yes | Yes | Yes | Yes | Yes | Yes | Yes | Yes | Yes |
| 1 < CCLDI < 9 | Yes | Yes | Yes | Yes | Yes | Yes | Yes | Yes | Yes | Yes | Yes | Yes | Yes | Yes |

|  | 15 | 16 | 17 | 18 | 19 | A AFFINITY 1570 | B AFFINITY 1840 | C EXCEED 399L60 | D EXCEED 350B60 | E EXCEED 350D60 |
|---|---|---|---|---|---|---|---|---|---|---|
| MI | 0.93 | 1.05 | 1.07 | 0.52 | 0.82 | 1.10 | 0.99 | 0.70 | 0.96 | 0.97 |
| Density (g/cc) | 0.920 | 0.916 | 0.929 | 0.920 | 0.920 | 0.915 | 0.910 | 0.925 | 0.917 | 0.917 |
| PDI | 3.04 | 2.96 | 2.62 | 2.87 | 3.35 | 2.26 | 2.11 | 2.47 | 2.34 | 2.45 |
| Lw/Ln | 8.11 | 7.61 | 7.55 | 1.78 | 1.95 | 1.90 | — | — | 4.78 | 4.48 |
| RSI | 4.1 | 4.2 | 3.3 | 6.3 | 6.4 | 7.4 | 8.2 | 2.4 | 2.4 | 2.2 |
| Haze (%) | 3.0 | 3.0 | 4.8 | 3.7 | 3.6 | 7.9 | 5.6 | 10.6 | 8.3 | 9.3 |
| Hexane Extract. | 1.1 | 1.7 | 0.6 | 0.4 | 1.8 | 0.5 | 0.7 | 0.3 | 0.3 | 0.4 |
| Dart Drop (g) | 234 | 383 | 71 | 770 | 275 | 413 | 362 | 157 | 613 | 710 |
| Die Gap (mils) | 100 | 100 | 100 | 100 | 100 | 100 | 100 | 100 | 100 | 100 |
| Melt Temp (° F.) | 423 | 423 | 429 | 480 | 460 | 410 | 392 | 435 | 432 | 432 |
| Blow Up Ratio | 2.6 | 2.6 | 2.6 | 4.4 | 2.6 | 2.6 | 2.6 | 2.6 | 2.6 | 2.6 |
| Head Pressure (psi) | 2200 | 2000 | 2000 | 2050 | 1650 | 1400 | 2250 | 2005 | 2170 | 2005 |
| Amperage | 14.8 | 14.0 | 14.5 | 15.0 | 13.5 | 11.6 | 13.9 | 14.9 | 14.9 | 14.9 |

-continued

| | | | | | | | | | | |
|---|---|---|---|---|---|---|---|---|---|---|
| Die Rate (lb/hr/in) | 7.1 | 6.1 | 6.9 | 7.1 | 6.3 | 6.9 | 6.7 | 6.8 | 6.9 | 6.8 |
| A = 370ρ–335 | 7.59 | 6.10 | 10.78 | 7.59 | 7.40 | 5.73 | 3.87 | 9.44 | 6.47 | 6.47 |
| B = RSI*MI0.6 | 3.92 | 4.33 | 3.44 | 4.22 | 5.66 | 7.84 | 8.16 | 1.93 | 2.34 | 2.16 |
| Haze < A | Yes | Yes | Yes | Yes | Yes | No | No | No | No | No |
| 2.5 < B < 6.5 | Yes | Yes | Yes | Yes | Yes | No | No | No | No | No |
| 2 < PDI < 4 | Yes | Yes | Yes | Yes | Yes | Yes | Yes | Yes | Yes | Yes |
| 1 < CCLDI < 9 | Yes | Yes | Yes | Yes | Yes | Yes | — | — | Yes | Yes |

| | F EXCEED 350L65 | G EXCEED 357C80 | H EXACT 2010 | I BASF KR1922 | J | K HS7093 | L HS7037 | M HS7028 | N DFDA 9064 | O |
|---|---|---|---|---|---|---|---|---|---|---|
| MI | 1.08 | 3.45 | 1.55 | 1.10 | 0.73 | 1.97 | 0.52 | 1.00 | 1.02 | 0.90 |
| Density (g/cc) | 0.917 | 0.917 | 0.925 | 0.909 | 0.923 | 0.927 | 0.923 | 0.920 | 0.911 | 0.916 |
| PDI | 2.50 | 2.24 | 2.03 | 1.98 | 2.16 | 4.10 | — | — | 3.70 | 2.83 |
| Lw/Ln | 2.80 | 2.66 | 1.22 | 1.89 | 3.01 | 13.97 | — | — | 11.64 | 2.49 |
| RSI | 2.1 | 1.5 | 1.8 | 2.2 | 2.8 | 2.8 | — | 4.8 | 5.6 | 8.90 |
| Haze (%) | 14.4 | 20.7 | 6.5 | 1.3 | 6.7 | 15.6 | 10.5 | 13.5 | 5.7 | — |
| Hexane Extract. | 0.6 | 1.0 | 0.3 | 0.9 | 0.5 | 2.2 | 1.0 | 3.5 | 5.9 | — |
| Dart Drop (g) | 770 | 368 | 137 | 410 | 158 | 59 | 50 | 101 | 112 | — |
| Die Gap (mils) | 100 | 100 | 100 | 100 | 100 | 100 | 100 | 100 | 100 | — |
| Melt Temp (° F.) | 435 | 388 | 430 | 430 | 490 | 391 | 484 | 420 | 395 | — |
| Blow Up Ratio | 2.6 | 2.6 | 2.6 | 2.6 | 2.6 | 2.6 | 2.6 | 2.6 | 2.6 | — |
| Head Pressure (psi) | 1910 | 1375 | 1625 | 1850 | 2600 | 1600 | 2200 | 2100 | 2075 | — |
| Amperage | 15.7 | 13.2 | 14.7 | 11.8 | 15.5 | 13.0 | 14.5 | 13.5 | 14.4 | — |
| Die Rate (lb/hr/in) | 6.6 | 7.4 | 6.9 | 6.6 | 6.6 | 7.1 | 6.9 | 7.3 | 7.1 | — |
| A = 370ρ–335 | 6.47 | 6.47 | 9.44 | 3.50 | 8.70 | 10.04 | 8.74 | 7.51 | 4.39 | 6.10 |
| B = RSI*MI0.6 | 2.20 | 3.20 | 2.35 | 2.3 | 2.31 | 4.23 | | 4.79 | 5.65 | 8.31 |
| Haze < A | No | No | Yes | Yes | Yes | No | No | No | No | — |
| 2.5 < B < 6.5 | No | Yes | No | No | No | Yes | — | Yes | Yes | No |
| 2 < PDI < 4 | Yes | Yes | Yes | No | Yes | No | — | — | Yes | Yes |
| 1 < CCLDI < 9 | Yes | Yes | Yes | Yes | Yes | No | — | — | No | Yes |

We claim:

1. An ethylene interpolymer having:

a) a polydispersity index of about 2 to about 4;

b) a melt index, MI, and relaxation spectrum index, RSI such that $(RSI)(MI^{0.6})$ is about 2.5 to about 6.5:

c) a crystallizable chain length distribution index, $L_w/L_n$, of $1 < L_w/L_n < 9$; and d) a density, ρ, in the range of 0.915 to about 0.950, and a percent haze when fabricated into a film such that the percent haze is less than 370ρ–335.

2. The ethylene interpolymer of claim 1 wherein the polydispersity index is about 2.5 to about 3.5 and the $L_w/L_n$ is 3.48–8.58.

3. The ethylene polymer of claim 1, wherein $(RSI)(MI^{0.6})$ is about 3.0 to about 5.0.

4. The ethylene polymer of claim 1, wherein $L_w/L_n$ is about 1 to about 6.

5. The ethylene polymer of claim 1 containing about 1 to about 40 percent by weight of a linear or branched alpha-olefin having from 3 to about 20 carbon atoms.

6. The ethylene polymer of claim 1 containing about 1 to about 40 percent by weight of a comonomer selected from propylene, 1-butene, 1-hexene, 4-methyl-1-pentene, 1-octene and mixtures thereof.

7. A film comprising the ethylene interpolymer of claim 1.

8. A shrinkable film comprising the ethylene interpolymer of claim 1.

9. An extrusion coated layer comprising the ethylene interpolymer of claim 1 on a substrate.

10. Wire and cable insulation comprising the ethylene polymer of claim 1.

11. A crosslinked, power cable insulation comprising the ethylene interpolymer of claim 1.

12. A molded article comprising the ethylene polymer of claim 1.

13. An insulating jacket comprising the ethylene interpolymer of claim 1.

14. A wire and cable jacket comprising the ethylene interpolymer of claim 1.

15. A semi-conductive jacket comprising the ethylene interpolymer of claim 1.

16. A semi-conductive shield comprising the ethylene interpolymer of claim 1.

17. A polymer blend comprising the ethylene polymer of claim 1.

18. The ethylene interpolymer of claim 1 wherein the $L_w/L_n$ is about 2 to about 6.

* * * * *